United States Patent
Edwards et al.

(10) Patent No.: US 6,352,779 B1
(45) Date of Patent: Mar. 5, 2002

(54) ELECTROMAGNETICALLY WELDED COMPOSITE AND THE PREPARATION THEREOF

(75) Inventors: Christopher M. Edwards, Midland, MI (US); Edward L. D'Hooghe, Hulst (NL); Hani Farah, Sugarland, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/712,328

(22) Filed: Nov. 14, 2000

Related U.S. Application Data
(60) Provisional application No. 60/166,200, filed on Nov. 18, 1999.

(51) Int. Cl.⁷ ............................................. B32B 27/36
(52) U.S. Cl. ...................................................... 428/412
(58) Field of Search ................................. 428/412, 196

(56) References Cited

U.S. PATENT DOCUMENTS

| | | | |
|---|---|---|---|
| 3,231,619 A | 1/1966 | Speranza | 528/196 |
| 4,376,834 A | 3/1983 | Goldwasser et al. | 521/159 |
| 4,612,335 A | 9/1986 | Cuscurida et al. | 521/167 |
| 4,888,446 A | 12/1989 | Klein et al. | 564/478 |
| 5,157,885 A | 10/1992 | Wertitsch et al. | 52/656 |
| 5,272,236 A | 12/1993 | Lai et al. | 526/348.5 |
| 5,278,272 A | 1/1994 | Lai et al. | 526/348.5 |
| 5,433,419 A | 7/1995 | Murakami | 264/136 |
| 5,627,254 A | 5/1997 | Oriani | 528/76 |
| 5,891,560 A | 4/1999 | Edwards et al. | 428/295 |

Primary Examiner—Terressa M. Boykin
(74) Attorney, Agent, or Firm—Reid S. Willis

(57) ABSTRACT

The present invention is an article comprising a fiber-reinforced engineering thermoplastic polyurethane composite welded to a thermoplastic part by way of an interlayer containing a dispersion of a ferromagnetic material and a method for preparing the same. Alternatively, the composite or the thermoplastic part or both may contain the ferromagnetic material. A tight bond is created by subjecting the ferromagnetic material to a radio-frequency magnetic field to generate heat, which locally melts composite and the thermoplastic part, then allowing the subjected areas to cool. The invention is particular useful for the preparation of window frames.

16 Claims, 1 Drawing Sheet

ELECTROMAGNETICALLY WELDED COMPOSITE AND THE PREPARATION THEREOF

This application claims benefit of provisional application No. 60/166,200, filed Nov. 18, 1999.

The present invention relates to electromagnetically welded, thermoplastic composite. Such a composite is particularly useful, for example, in the manufacture of window frame profiles.

Window frame profiles are typically made from wood, polyvinyl chloride, or aluminum. Although wood is rigid and aesthetically pleasing, it requires much maintenance, it is inconsistent, and has availability limitations. Polyvinyl chloride (PVC) requires little or no maintenance and is readily available and consistent, but has a low modulus and high coefficient of linear thermal expansion (CLTE). Its application in window frame profiles is therefore limited to domestic windows. Aluminum, on the other hand, has a relatively low CLTE and high modulus, but it also very thermally conductive, and requires elaborate systems to create thermal breaks to prevent significant heat loss.

In view of the deficiencies in the art, it would be desirable to discover a material that is strong and light-weight, one that has high energy absorption and high modulus, as well as low CLTE and low thermal conductivity, and one that is easy to style and shape.

The present invention addresses a need in the art by providing an article comprising a thermoplastic composite welded to a substrate, wherein either a) the composite or the substrate or both the composite and the substrate contain a dispersion of ferromagnetic particles or b) the composite and the substrate are bonded together through a ferromagnetically filled interlayer; wherein the composite is reinforced with continuous fibers.

In another aspect, the invention is a thermoplastic composite frame comprising: a) a plurality of hollow elongated thermoplastic composites having inner walls, each composite being reinforced with continuous fibers and abutting at each end to form a plane; and b) a plurality of thermoplastic joints containing a dispersion of ferromagnetic particles, wherein each joint is ferromagnetically bonded to the inner walls of abutting composite ends.

In another aspect, the invention is a method for welding a thermoplastic composite to a substrate comprising the steps of a) situating a ferromagnetically-filled thermoplastic interlayer material between the composite and the substrate; and b) subjecting the ferromagnetically-filled thermoplastic material, the thermoplastic composite, and the substrate to a radio frequency magnetic field to generate sufficient heating in the ferromagnetically-filled material to create a bond between the thermoplastic composite and the substrate, wherein the composite is reinforced with continuous fibers.

The composite of the present invention addresses a need in the art by providing a simple and effective means of preparing two- or three-dimensional thermoplastic composite profiles. Furthermore, the invention provides generally for a simple means of welding a thermoplastic composite to another thermoplastic material.

Figure 1:
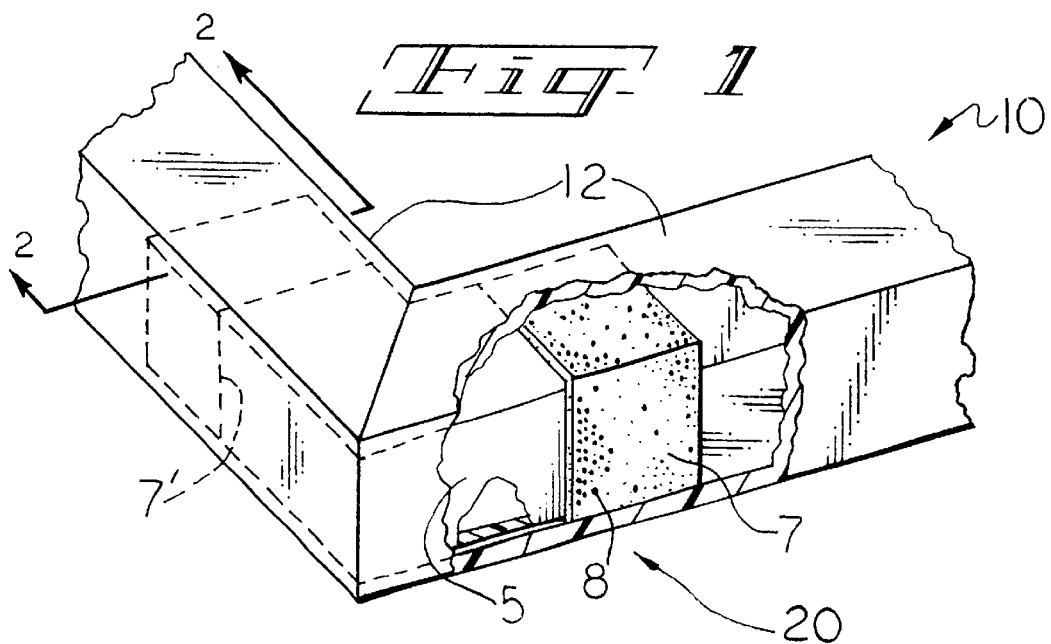
FIG. 1 is an illustration of two polyurethane engineering thermoplastic composite profiles joined together by electromagnetically welded tie layers overmolded on a thermoplastic joint.

The article of the present invention comprises a thermoplastic composite bonded to a substrate by either dispersing a ferromagnetic material in the composite or the substrate or both or by providing a ferromagnetically filled thermoplastic material as an interlayer between the composite and the substrate. The substrate may be the same as or different from, and compatible or incompatible with the composite. As used herein, the term "thermoplastic composite" refers to a thermoplastic material reinforced with continuous fibers. The thermoplastic composite is advantageously prepared by a pultrusion method such as described in U.S. Pat. 5,891,560, which teaching is incorporated herein by reference. The resultant pultruded part contains a plurality of continuous fibers, which may be substantially parallel fibers through the length of the composite and/or multidirectional random mats or fabrics. These composites which can be molded into a wide variety of shapes, including the shape of a hollow tube. The pultruded part can also be shaped into strips having a thickness of preferably at least 0.2 mm that can be overmolded or overextruded with a thermoplastic material to form a similar open tubular material.

The thermoplastic composite contains a thermoplastic material such as an engineering thermoplastic polyurethane, a polyester, a polyamide, ABS, a polysulfone, a polyoxymethylene, a polypropylene, a polyarylene sulfide, a polyphenylene oxide/polystyrene blend, a polyetheretherketone and a polyetherketone. A preferred thermoplastic composite is an engineering thermoplastic polyurethane composite.

The term "engineering thermoplastic polyurethane" is used to refer to a thermoplastic polyurethane that has a glass transition temperature of not less than 50° C. The disclosure and preparation of engineering thermoplastics polyurethane, also known as rigid thermoplastic polyurethanes, can be found in U.S. Pat. Nos. 4,376,834 and 5,627,254, which teachings are incorporated herein by reference. Commerical examples of engineering thermoplastic polyurethanes include ISOPLAST™ engineering thermoplastic polyurethanes (a trademark of The Dow Chemical Company).

The term "thermoplastic composite" is used to refer to a composite that is either encased (for example, overmolded or overextruded onto) or not encased in a thermoplastic material. Where the composite is encased in a thermoplastic material, the bonding actually occurs between the substrate and the thermoplastic material.

The term "ferromagnetically-filled thermoplastic interlayer material" is used herein to refer to a thermoplastic material that contains a dispersion of magnetizable particles. Examples of ferromagnetic materials include ferrites such as barium ferrite and strontium ferrite, iron oxides such as $Fe_3O_4$ and $Fe_2O_3$, alloys of iron, aluminum, nickel, cobalt, copper, carbon, titanium, manganese, chromium, tungsten, platinum, silver, molybdenum, vanadium, or niobium or combinations thereof such as powdered alnico alloys, cunico alloys, chromium steel, cobalt steel, carbon steel and tungsten steel. The size of the magnetizable particles is generally in the range of submicron to mm.

The thermoplastic interlayer material can be the same as or different from the substrate and the composite, and may include additional fillers such as glass. Although it is possible to form a bond between the composite and the substrate in the absence of an interlayer material by dispersing the magnetizable particles in either the composite or the substrate, it is generally preferred to provide a separate ferromagnetically-filled thermoplastic interlayer material. This is especially true where the surfaces to be joined have significantly incompatible bonding characteristics. A commercial example of a ferromagnetically-filled thermoplastic interlayer material is EMAWELD™ interlayer (a trademark of Ashland Chemical Co.).

The nature of the thermoplastic interlayer material depends largely on the compatibility of the substrate and the composite. The word "compatible" is used herein to refer to materials, which when thermally bonded together, form a bond that is sufficiently strong for the given application. Where the composite (or more particularly the thermoplastic itself) and the substrate are compatible, the interlayer material is preferably any other compatible thermoplastic material more preferably either the same material as the substrate or the composite thermoplastic material.

Thermoplastic materials that are suitable as interlayers where the substrate and the composite are compatible, and where the composite is an engineering thermoplastic polyurethane composite, include polyesters such as polyethylene terephthalate and polybutylene terephthalate, ABS terpolymers, an acrylonitrile-styrene-acrylate terpolymers, polycarbonates, polyvinyl chlorides, polyvinyl alcohols, ethylene-vinyl acetate copolymers, ethylene-vinyl alcohol copolymers, polyvinyl acetates, engineering thermoplastic polyurethanes, or thermoplastic polyurethane elastomers.

Where the substrate and the composite are incompatible, the thermoplastic interlayer preferably contains a material that compatibilizes the composite and the substrate. Under some circumstances, thermoplastics that are suitable as interlayers for compatible substrates and thermoplastic composites may also be suitable for incompatible subtrates and composites. For example, if the composite is an engineering thermoplastic polyurethane composite and the substrate is a polyolefin, a ferromagnetically-filled ethylene-vinyl acetate copolymer may be used as an interlayer.

Alternatively, the thermoplastic interlayer for incompatible substrates and composites may contain a compatibilizer for a polymeric hydrocarbon (that is, a polyolefin, an alkenyl aromatic hydrocarbon, or a polyolefin-alkenyl aromatic hydrocarbon interpolymer) and polar thermoplastics such as those suitable as interlayers for compatible substrates and composites.

Such compatibilizers generally contain a polymeric hydrocarbon portion that is grafted or incorporated with a polar portion. These compatibilizers are preferably prepared by the step comprising reacting a) a polymeric hydrocarbon having pendant or incorporated amine-reactive groups; and b) a hydroxylamine or a polyamine.

Examples of polyolefins include polypropylenes, high density polyethylenes (HDPE), low density polyethylenes (LDPE), linear low density polyethylenes (LLDPE), or substantially linear ethylene/α-olefin copolymers such as those copolymers described in U.S. Pat. Nos. 5,272,236 and 5,278,272. Examples of polymers of alkenyl aromatic hydrocarbons include polymers of styrene, α-methylstyrene, and vinyltoluene. Ethylene-styrene interpolymer is an example of a polyolefin-alkenyl aromatic hydrocarbon interpolymer.

Amine-reactive groups can be made pendant to the backbone of the polymeric hydrocarbon by grafting of an ethylenically unsaturated amine-reactive compound. Alternatively, amine reactive groups can be incorporated into the backbone of the polymer by copolymerization of the polymeric hydrocarbon monomer with an ethylenically unsaturated amine-reactive compound. Grafting is a preferred means of attaching the amine-reactive groups into the polymer.

As used herein, the term "ethylenically unsaturated amine-reactive compound" refers to a compound that a) can be attached to the polymer by grafting or copolymerization and b) is chemically reactive with an amine. Similarly, the term "amine-reactive group" is used herein to refer to the remnant formed by grafting or copolymerization. Examples of ethylenically unsaturated amine-reactive compounds that can be grafted onto the polymer backbone or copolymerized with the polymeric hydrocarbon monomer include ethylenically unsaturated carboxylic acids such as maleic acid, fumaric acid, itaconic acid, acrylic acid, methacrylic acid, and crotonic acid; acid anhydrides such as maleic anhydride and itaconic anhydride; vinyl benzyl halides such as vinyl benzyl chloride and vinyl benzyl bromide; alkyl acrylates and methacrylates such as methyl acrylate, ethyl acrylate, butyl acrylate, lauryl acrylate, methyl methacrylate, ethyl methacrylate, butyl methacrylate, and lauryl methacrylate; and ethylenically unsaturated oxiranes such as glycidyl acrylate, glycidyl methacrylate, and glycidyl ethacrylate. Preferred ethylenically unsaturated amine-reactive compounds include maleic anhydride, acrylic acid, methacrylic acid, glycidyl acrylate, glycidyl methacrylate, with maleic anhydride being more preferred. Polypropylene grafted with maleic anhydride is a more preferred modified polymer. An example of a commercially available modified polymer is EPOLENE™ PP 3003 wax (a trademark of Eastman Chemical Co), which is a propropylene wax that contains from about 0.5 to 1 weight percent grafted maleic anhydride units.

The degree of incorporation or grafting of the amine-reactive group is application dependent, but is preferably not more than 10 weight percent, more preferably not more than 5 weight percent, more preferably not more than 2 weight percent, and most preferably not more than 1 weight percent; and preferably not less than 0.01 weight percent, more preferably not less than 0.1 weight percent, and most preferably not less than 0.2 weight percent, based on the weight of the polymer backbone.

The hydroxylamine is a compound containing an amine group and at least one hydroxyl group, preferably only one hydroxyl group. Similarly, the polyamine is a compound that contains at least two amine groups. The amine can be a primary or a secondary amine, and is preferably a primary amine. A preferred class of hydroxylamines and polyamines is represented by the following formula:

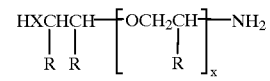

where X is either NH or O; where each R is independently H, —CH$_3$, or —CH$_2$CH$_3$; and where x is from 0 to 50. The disclosure and preparation of a preferred class of hydroxyl amines can be found in U.S. Pat. Nos. 3,231,619, 4,612,335, and 4,888,446, which teachings are incorporated herein by reference. Examples of suitable alkanolamines include 2-aminoethanol, 1-amino-2-propanol, 2-amino-1-propanol, 3-amino-1-propanol, 2-(2-aminoethoxy)ethanol, 1-amino-2-butanol, 2-amino-3-butanol, and polyoxyalkylene glycol amines. 2-Aminoethanol is a preferred alkanolamine. Examples of suitable polyamines include α-ω alkylene diamines such as ethylene diamine, 1,3-propylene diamine, 1,4-butylene diamine, and 1,6-hexylene diamine, as well as polyoxyalkylene diamines, commercially available as JEFFAMINE™ polyoxyalkylene diamines (a trademark of Huntsman Petrochemical). The modified polymer is preferably reacted with a stoichiometric excess of the hydroxyl amine or polyamine so as to ensure complete or substantially complete conversion of the amine-reactive group to form the compatibilizer.

The interlayer may optionally contain a co-compatibilizing amount of an engineering thermoplastic polyurethane along with the compatibilizer. As used herein, the term "co-compatibilizing amount" refers to the amount of the engineering thermoplastic polyurethane sufficient to improve the modulus of the interlayer. Preferably, the weight-to-weight ratio of the co-compatibilizing engineering thermoplastic polyurethane and the compatibilizer is from about 0 to about 10:1. The interlayer may also include some amount of the substrate material (for example, polypropylene) to reduce cost of the interlayer material while still preserving adequate physical properties of the bonded article.

Preferably the ferromagnetically-filled thermoplastic interlayer material is first contacted with or adhered to the substrate by overmolding, overextruding, or in a separate step. Second, the thermoplastic composite, preferably the engineering thermoplastic polyurethane composite is abutted against the substrate and interlayer; finally, the composite, the ferromagnetically filled interlayer material and the substrate are then subjected to a radio-frequency magnetic field to rapidly generate heat and to create a fluid material at the interface of the composite and the substrate.

In one embodiment of the invention, overmolded or overextruded or nonovermolded or nonextruded hollowed tubular composites are cojoined to form the shape of frame. FIG. 1 is an illustration of one embodiment of a portion of the frame (10). The portion (10) is cojoined by an L-shaped insert (20), which may be glass filled, inserted snuggly into two abutting, square shaped hollow fiber-reinforced thermoplastic composites (12), preferably fiber-reinforced engineering thermoplastic polyurethane composites. In this embodiment, each insert (20) contains a thermoplastic overlay material (7) overmolded or overextruded onto each end of a thermoplastic jointing material (5). The overlay material (7) contains a dispersion of ferromagnetic particles (8). The thermoplastic overlay material (7) is compatible with the composite (12) and the thermoplastic jointing material (5), and may be the same material as either of the materials to be cojoined. A tight bond is created by subjecting the jointed corner to a magnetic field at such a field strength and frequency and for such time to cause the ferromagnetic material to heat up, thus causing the abutting materials to locally melt at their interfaces, then allowing the material to cool.

Figure 2:
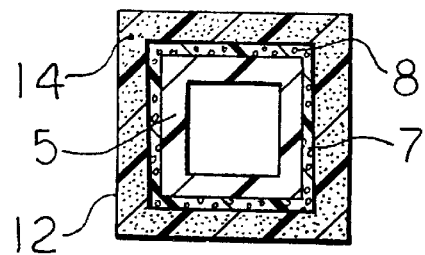
FIG. 2 is a side view of a square outer composite profile, a ferromagnetically-filled thermoplastic tie layer, and a fitting.

FIG. 2 is a side view of the the square-shaped hollow composite (12), the thermoplastic overlay (7), and the thermoplastic jointing material (5). The composite (12) contains preferably at least 30 percent by volume of continuous fibers (14).

Figure 3:
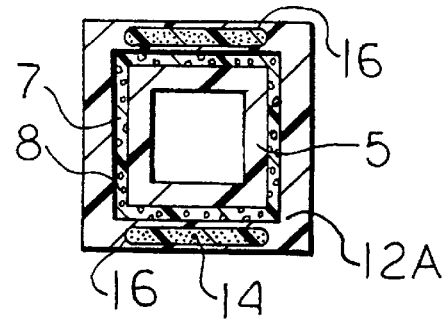
FIG. 3 is a side view of a square profile of a thermoplastic overmolded composite, a ferromagnetically-filled thermoplastic tie layer, and a fitting.

FIG. 3 is a side view of a slightly different embodiment of the invention. Here, an elongated hollowed square shape outer layer is formed by overmolding a thermoplastic material (12a) over two elongated composite strips (16) to form a a square-shaped composite material similar to (12). This embodiment is otherwise the same as that shown in FIG. 2.

Figure 4:
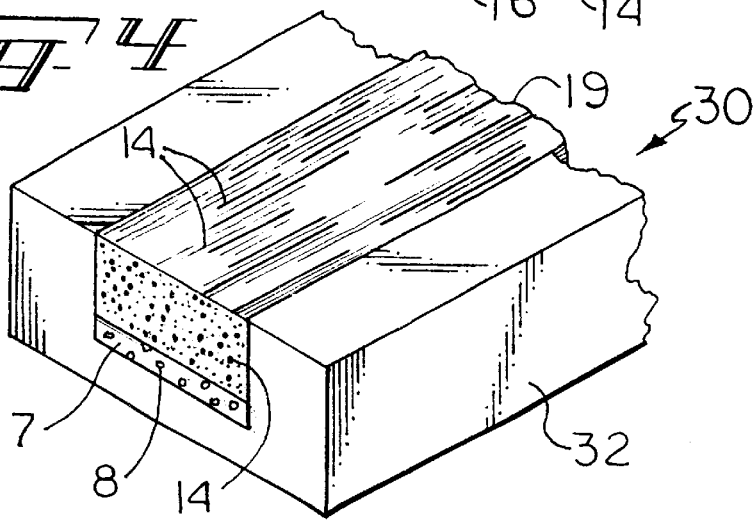
FIG. 4 is an illustration of a grooved thermoplastic part welded to a polyurethane engineering thermoplastic composite part by way of a ferromagnetically-filled tie layer.

FIG. 4 illustrates another embodiment of the present invention. A laminated part (30) comprises a thermoplastic body having a recess (32). A strip of thermoplastic overlay (7) containing ferromagnetic particles (8) is situated in the recess. A thermoplastic polyurethane composite (19) containing continuous fibers (14) is placed atop the overlay (7) and the part is subjected to a magnetic field as described herein.

The present invention provides a fast and simple way of preparing a variety of two- or three-dimensional objects such as window frames, plastic wood, furniture profiles including those used to build an open or closed frame for storage, reinforced walls for fences, cubicles, and containers. Furthermore, the invention provides a convenient method of encasing an thermoplastic composite, more particularly an engineering thermoplastic polyurethane composite, with a thermoplastic that would be otherwise incompatible with the composite.

What is claimed is:

1. An article comprising a thermoplastic composite welded to a substrate, wherein either a) the composite or the substrate or both the composite and the substrate contain a dispersion of ferromagnetic particles or b) the composite and the substrate are bonded together through a ferromagnetically filled interlayer; wherein the composite is reinforced with continuous fibers.

2. The article of claim 1 wherein the composite and the substrate are bonded together through a ferromagnetically filled thermoplastic interlayer, and the composite is an engineering thermoplastic polyurethane composite.

3. The article of claim 2 wherein the substrate and the composite are incompatible.

4. The article of claim 3 wherein the thermoplastic interlayer contains a compatibilizer which is a polymeric hydrocarbon having pendant or incorporated hydroxyl groups or amine groups.

5. The article of claim 4 wherein the thermoplastic interlayer further contains a co-compatibilizing amount of an engineering thermoplastic polyurethane.

6. The article of claim 3 wherein the thermoplastic interlayer contains ethylene-vinyl acetate copolymer.

7. The article of claim 2 where the substrate and the composite are compatible.

8. The article of claim 7 wherein the thermoplastic interlayer includes an overlay material which contains the dispersion of the ferromagnetic particles.

9. The article of claim 8 wherein the thermoplastic interlayer includes polyethylene terephthalate, polybutylene terephthalate, a polycarbonate, polyvinyl chloride, polyvinyl alcohol, ethylene-vinyl acetate copolymer, or a polyvinyl acetate.

10. The article of claim 1 wherein the composite, the substrate, or both the composite and the substrate contain a dispersion of ferromagnetic particles.

11. The article of claim 1 wherein the composite contains at least 30 percent by volume of reinforcing fibers that extend through the length of the composite, wherein the thickness of the composite is at least 0.2 mm.

12. A thermoplastic composite frame comprising:

a) a plurality of hollow elongated thermoplastic composites having inner walls, each composite being reinforced with continuous fibers and abutting at each end to form a plane; and b) a plurality of thermoplastic joints containing a dispersion of ferromagnetic particles, wherein each joint is ferromagnetically bonded to the inner walls of abutting composite ends.

13. The composite frame of claim 12 which is substantially rectangular, wherein the thermoplastic composites are engineering thermoplastic polyurethane composite.

14. The composite frame of claim 13 wherein the thermoplastic joints include a thermoplastic overlay material which contains the dispersion of the ferromagnetic particles.

15. A method for welding a thermoplastic composite to a substrate comprising the steps of a) situating a ferromagnetically-filled thermoplastic interlayer between the thermoplastic composite and the substrate; and b) subjecting the ferromagnetically-filled thermoplastic material, the thermoplastic composite, and the substrate to a radio frequency magnetic field to generate sufficient heating in the ferromagnetically-filled material to create a bond between the polyurethane engineering thermoplastic composite and the substrate, wherein the composite is reinforced with continuous fibers.

16. The method of claim 15 wherein the thermoplastic composite is a continuous fiber-reinforced engineering thermoplastic polyurethane.

\* \* \* \* \*